July 11, 1972

F. D. NIX 3,676,101

SELF-SUSPENDING AMMONIUM POLYPHOSPHATE SUSPENSION FERTILIZER

Original Filed Jan. 28, 1971

PRODUCTION OF AMMONIUM POLYPHOSPHATE SUSPENSIONS COOLING BY DIRECT CONTACT WITH OIL

Fred D. Nix
BY Robert A. Petrusek

Fig. 2

COOLER-SEPARATOR VESSEL FOR PRODUCTION OF SUSPENSION FERTILIZER WITH DIRECT-CONTACT OIL COOLING

Fig. 4

COOLER-SEPARATOR VESSEL USED IN PRODUCTION OF SUSPENSION FERTILIZERS

United States Patent Office 3,676,101
Patented July 11, 1972

3,676,101
SELF-SUSPENDING AMMONIUM POLYPHOS-
PHATE SUSPENSION FERTILIZER
Fred D. Nix, Phil Campbell, Ala., assignor to Tennessee
Valley Authority, Muscle Shoals, Ala.
Continuation of application Ser. No. 110,537, Jan. 28,
1971, which is a continuation-in-part of abandoned application Ser. No. 836,386, June 25, 1969. This application Aug. 2, 1971, Ser. No. 168,280
Int. Cl. C05b 7/00
U.S. Cl. 71—34
4 Claims

ABSTRACT OF THE DISCLOSURE

A process for improving the storage characteristics of ammonium polyphosphate clayless base suspensions while increasing the grade up to 14-47-0 involves causing fine crystals of ammonium polyphosphate to be formed in the fresh suspension by close control of the $P_2O_5$ (80-81 percent) content of the superphosphoric acid fed thereto and quick-cooling the product by direct contacting in a chilled fluid immiscible therewith.

The invention herein described may be manufactured and used by or for the Government for governmental purposes without the payment to us of any royalty therefor.

This application is a continuation of my copending application Ser. No. 110,537, filed Jan. 28, 1971, for Self-Suspending Ammonium Polyphosphate Suspension Fertilizer, which application in turn, is a continuation-in-part of my copending application Ser. No. 836,386, filed June 25, 1969, for Self-Suspending Ammonium Polyphosphate Suspension Fertilizer. The parent application, that is Ser. No. 836,386, was abandoned in favor of said continuation-in-part application.

My invention relates to improved processes for the production of high-analysis fluid fertilizer clayless suspensions, particularly fluid fertilizer suspensions prepared by ammoniating superphosphoric acid; more particularly to processes for the production of fluid fertilizer suspensions that are higher in grade than those now commercially available, and which will store for acceptable periods of time without growth of large crystals or increases in viscosity; still more particularly to the production of such suspension in which the requirement heretofore for use of "nucleating" or "suspending" agents such as attapulgite, bentonite, and other clays is completely eliminated; and still more particularly to the cooling of such suspensions by direct contacting a chilled fluid immiscible therewith.

The production and use of fluid suspension type fertilizers having composition grades similar to those of dry fertilizers have been known and such fertilizers are increasing in use in the industry. For example, it is generally conceded that the first production of liquid mixed fertilizers in the United States occurred at Oakland, Calif., in 1923. For the next 30 years the high coast of ingredients restricted liquid mixed fertilizers primarily to specialty uses. With changing conditions, however, use began to climb rapidly in the early 1950's. It reached approximately 525,000 tons in 1961 and passed the one-million-ton mark in 1965.

Actually, of course, there are at least five types of fluid fertilizers—anhydrous ammonia, aqua ammonia, nitrogen solutions, liquid mixed fertilizer solutions, and suspensions. My invention is concerned only with liquid mixed fertilizer products, and still more specifically to fluid fertilizers of the suspension type, i.e., products in which some plant nutrient materials are finely divided solids suspended in the liquid. Generally, liquid mixed fertilizers are made by dissolving chemicals in water, or by neutralizing phosphoric acid with ammonia to obtain a combination of highly soluble ammonium phosphates. Nitrogen such as urea or urea-ammonium nitrate solution can be added to increase the ratio of nitrogen to phosphorus. Potash also can be added to make three-nutrient liquid mixes. Fluid fertilizer suspensions are produced in about the same way except that usually a suspending agent, such as bentonite or attapulgite clay, is added. The clay, in addition to being a gelling and therefore a suspending agent, also helps to prevent subsequent crystal growth during storage. Of course, other methods can be practiced in the preparation of fluid suspension fertilizers such as, for example, controlling the rates, amounts, and sequence of constituents added and by controlling the temperature at various steps and stages of preparation. Several of these methods and other considerations for the preparation of fluid suspension type fertilizers are found in U.S. Letters Patents 3,096,170, 3,109,729, 3,113,858, 3,234,004, and 3,326,666. As may be seen from the patent literature, one of the objectives of preparing suspensions is to limit or to eliminate the settling of solids during subsequent storage and it will be noted that in well-prepared suspensions, settling of solids during subsequent storage is very slow even over long periods of time, i.e., under ideal conditions for weeks or even months. However, if there is settling, the solids usually can be easily redispersed by circulating the suspension through a tank with a pump or preferably by sparging air into the storage tank.

As has been noted above, there has been an unusually rapid growth in the manufacture and application of liquid mixed fertilizers in the last few years. Following are some of the reasons leading to this rapid growth of production and use.

In the early 1950's surplus furnace grade orthophosphoric acid found a home in liquid mixed fertilizers. This acid was ammoniated to make an 8-24-0 base solution. Synthetic urea production began to spiral upwards. Nitrogen such as urea or urea-ammonium nitrate solutions were available to be combined with the same base solution to make high nitrogen liquid mixed fertilizers.

The second advance came as a result of a big technological breakthrough that began in about 1958 when TVA demonstrated that furnace superphosphoric acid could be produced commercially. A year or so later, TVA pilot-plant demonstrations showed that lower cost wet-process superphosphoric acid could be produced successfully. These developments led to widespread introduction of 10-34-0 and 11-37-0 base solutions which are presently produced commercially according to the teachings of U.S. Letters Patent 2,950,961, Striplin, Jr., et al. It should be kept in mind at this point that these base solutions are in fact true solutions when prepared according to Striplin in which there are very little, if any, suspended solids. Subsequently researchers found and manufacturers demonstrated that the polyphosphates in super acid, and in base solutions made from it, can be used as a sequestering agent to prevent settling of impurities in neutralized wet-process phosphoric acid. These teachings may be found in U.S. Letters Patent 3,015,552, Striplin, Jr., et al. As an additional bonus, these polyphosphates made it possible to produce higher analysis mixtures.

This progress set the stage for production of liquid mixes in low-cost, cold mix plants. Using 10-34-0 or 11-37-0 as a base solution, a dealer could easily add a urea-ammonium nitrate solution and finely ground high-grade muriate of potash. In areas where potash requirements were low, the cold mix plants offered real savings since not even an agitator was needed to mix most grades. Dealers could also add small amounts of micronutrients in the N-P grades and even to the potash grades, depending on the solubility of the micronutrients. This success of early cold mix plants stimulated the fertilizer industry to adopt this type of plant rapidly. Many companies with hot mix plants began to use them as cold mix plants.

Although polyphosphates jumped the analyses of some liquid mixed grades by as much as one-third, high potash grades still couldn't be made because of the low solubility of potassium salts. Therefore, it was necessary to tackle the problem of making high potash grades with the desirable physical and chemical characteristics of a liquid mixed fertilizer. Suspension seemed to be the answer. Unlike liquid mixes, not all the potash in suspensions must be dissolved. This means that higher analysis grades including those especially high in potash can be produced. Suspensions can come very close to matching the analyses of dry blends. The high grades result in considerable savings in costs of freight, storage, and handling. The ratio of micronutrients to primary nutrients can also be increased more in a suspension than in a liquid mix. To this point I have described the research and technology behind the growth of liquid mixes and more specifically suspensions. I would now like to discuss briefly why fluid fertilizers, especially of the suspension type, have become popular with fertilizer manufacturers and dealers and with the ultimate consumer—the farmer. In the production of these materials, the manufacturer does not have the expensive production steps of (1) granulating, (2) drying, (3) cooling, (4) sizing, and (5) surface conditioning of the granules. Liquid mixes and, more importantly, suspensions are easy to handle. Numerous systems have been developed which can be easily used to distribute them. Adding micronutrients when needed is another important factor. In a liquid mix you can easily add micronutrients up to the amount that can be dissolved and, of course, in suspensions even greater amounts may be employed. This is a key point with manufacturers because it gives them flexibility in producing materials to meet the specific needs of each farm customer.

Adding insecticides and herbicides to fertilizers is a growing trend. If these materials are soluble or can be suspended in powdered form, they can easily be custom-mixed with suspensions. But a word of caution—in all cases, insecticides and herbicides should be used as directed by the manufacturer.

Liquid mixes and, more importantly, suspensions have become popular with dealers and farmers because they cut down manpower requirements and can be applied uniformly. For example, the distribution pattern of a broadcast suspension shows a high degree of homogeneity.

It should, of course, be understood by those individuals not yet acquainted with liquid mixes, and more specifically, suspensions, that it will be necessary to know how to handle them properly. They must learn the physical and chemical characteristics, how to formulate grades, and how to properly operate pumps and valves. In addition, there is also the consideration of preventing corrosion and the fertilizer dealer must know how to operate the specialized equipment needed to handle liquid mixes, and more specifically, suspensions. This then is the story behind liquid mixed, and more specifically, fluid suspension fertilizers and how and why they have broadened the fertilizer market for the benefit of fertilizer producers, the retail dealer, and most importantly, the farmer.

Most of the ammonium polyphosphate salt suspension fertilizers now being produced are used as base suspensions in the preparation of three-component (N-P-K) suspensions. Therefore, they must have characteristics that are essential for manufacture of satisfactory N-P-K suspensions, as well as characteristics that are essential for shipping and storage of the base suspension. Present ammonium polyphosphate salt (base) suspensions are limited in grade to about 12–40–0 and only short-term storage is feasible, without clay, because of growth of large crystals and increases in viscosity. The presence of large crystals are particularly undesirable because they cause settling both in the base suspension and in the three-component fertilizers and they plug up spray nozzles and other equipment. The limit of grade to 12–40–0 limits the grade of three-component suspensions and increases handling and shipping costs.

Ammonium polyphosphate salt suspension fertilizers (12–40–0) are made from reaction of ammonia and water with superphosphoric acid usually containing from 78–80 percent $P_2O_5$. The procedure is not too unlike that disclosed in 2,950,961, Striplin et al., supra; however, Striplin's advance is directed principally to the production of liquid solution fertilizers rather than salt suspension fertilizers and in order to produce the solution fertilizers with which he is concerned, the procedural requirements that he has outlined should be followed closely with the exception that the temperature limitation can be extended upwards to the range of about 180°–200° F. in order to produce such true solutions. In addition, as noted above, his teachings are the basis for the preparation of 10–34–0 and 11–37–0 base solutions. Although Striplin teaches the preparation of more concentrated liquid fertilizer solutions of grades approximately 14–42–0 and 15–45–0, he indicates that these more concentrated solutions were prepared only on small scale. Further, he does not give data on the long-term storage characteristics of these solutions. I have now found that if one closely follows the teachings of Striplin, a 12–40–0 solution can be produced, but due to the extremes in temperature fluctuations of such materials in storage tanks oftentimes encountered for periods in excess of about one week and ranging up to three or more months, these solutions will oftentimes, on such long-term storage, salt out. These findings are not unique with me in that the industry has also apparently found the same results and instead of trying to store 12–40–0 liquid mixed fertilizers as true solutions, prepared as in Striplin, the trend has been to deviate from such teachings and to engage in the production of suspensions rather than true solutions in order to initiate the formation of the crystals which salt out in a manner that the suspensions resulting therefrom may have a relatively high suspension volume. Present commercially available ammonium polyphosphate salt suspensions are limited in this grade of about 20–40–0 and they have been developed only to the stage where short-term storage is feasible, without clay, i.e., they must be applied to the soil within a matter of a few days to only a few weeks after their preparation. Otherwise, the growth of crystals in the suspension will have progressed to a stage where they, in addition to settling, will, even if redistributed in the suspensions, cause the clogging up of spray nozzles and orifices in application equipment to such a degree that they are not only unsatisfactory to the dealer wishing to apply them, but they are in fact possessed with characteristics wherein they simply cannot be used.

In more recent work by T. M. Jones in U.S. application Ser. No. 741,099, filed June 28, 1968, and now abandoned in favor of Ser. No. 154,772, filed June 21, 1971, assigned to the assignee of the present invention, he has found that after the ammonium polyphosphate salt suspension fertilizer is made and while the suspension is still fresh and has a pH in the range from about 5.9 to 6.1, the viscosity is generally in the range from about 1000 to 1300 centipoises at 32° F. Frequently, these fresh suspensions, as prepared by modifying Striplin, do not contain any solid phase other than added clay, which is added as a gelling and suspending agent. However, during subsequent handling and storage, crystallization occurs because polyphosphates hydrolyze and the solution becomes supersaturated with orthophosphate salts. Also, Jones has determined that the magnesium in such clays, as for instance attapulgite, bentonite, and the like, adds to the formation of crystals. Thus, Jones observed that crystals of monoammonium phosphate $[NH_4H_2PO_4]$, diammonium phosphate $[(NH_4)_2HPO_4]$, or magnesium ammonium pyrophosphate $[Mg(NH_4)_6(P_2O_7)_2 \cdot 6H_2O]$ occur and grow to sizes larger than can be tolerated (plus 20 mesh). In addition, undesirable increases in the viscosity are frequently associated with formation (nucleation) and growth of such crystals and cause difficulty in pumping and handling of the suspensions.

In the case of three-component (N-P-K) suspension fertilizers, they are usually prepared by adding supplemental nitrogen such as urea-ammonium nitrate solution (32% N) and potassium chloride (—20 mesh) to ammonium polyphosphate base suspensions of 12–40–0. The suspensions are not customarily stored because of growth of large crystals and the resultant settling thereof. Jones has identified most of the large crystals in suspensions stored at normal temperatures as potassium nitrate and potassium chloride; at lower temperatures (32° F.). Ammonium chloride and urea-ammonium chloride may also be present but dissolve when the temperature is increased (40° to 50° F.). New crystals nucleate as the result of the reaction of ammonium nitrate with potassium chloride. The continued slow dissolution of potassium chloride causes slow crystallization and growth of large crystals. When the formulations of the suspensions to be produced are concentrated and evenly balanced, such as 15–15–15, this crystal growth is most severe.

Therefore, the method of Jones' teachings accomplishes the objectives of producing ammonium polyphosphate base suspensions and/or three-component (N-P-K) suspensions that are higher in grade and will store for longer periods of time than those now being produced without growth of large crystals, increases in viscosity, or significant settling of solids.

Jones teaches the addition to or in situ generation of large numbers of the final equilibrium-type of crystals as small seed in saturated solution and selection of a pH that will remain in the appropriate range to maintain stability between the solid and liquid phases during storage and prevent nucleation of new crystalline phases. He teaches that the production of salt suspensions that are higher in grade and that will store satisfactorily for much longer periods of time than those currently being produced may be accomplished by the proper selection of pH, concentration, and amount of clay used as the suspending agent, together with addition or in situ generating in a saturated solution many small crystals, preferably nuclei, or any type that might grow large during storage.

My invention is directed to the production of completely water soluble (clayless) base suspensions ($N+P_2O_5$) which range in grade from 13–43–0, 13–45–0, and most significantly up to 14–47–0, thereby providing a material containing substantially less water than heretofore commercially available base suspensions, resulting in great economical advantages and reductions in processing, handling, and shipping costs, which improved suspensions store essentially as well as such commercially available clay-containing fertilizer suspensions, and which suspensions can be produced, handled, and stored without the use of any clay or nucleating or suspending agents which, as has been demonstrated supra, though oftentimes expedient for short-term storage (few days) sometimes leads to exaggerated settling and crystal growth during storage periods ranging from several weeks to several months.

To further amplify upon the advantages of my invention, great economic savings in handling and shipping costs should be realized as a result of the higher plant nutrient concentration since 14–47–0 is 27 percent more concentrated than 11–37–0 liquid and 17 percent more concentrated than 12–40–0 base suspension. The 11–37–0 and 12–40–0 are base materials now commonly used for the production of liquid and suspension fertilizers. A further savings would be a reduction of manufacturing costs. For example, in producing base 14–47–0 as compared with 12–40–0, the clay addition step, which involves labor, equipment, and raw material, would be completely eliminated. In the case of more recent work by Jones (U.S. application Ser. No. 741,099, filed June 28, 1968), he teaches the addition to, or in situ generation of, large numbers of the final equilibrium type of crystals as small seed in saturated solution and selection of pH that will remain in the appropriate range to maintain stability between the solid and liquid phases during storage and prevent nucleation of new phases. Also, he teaches that salt suspensions can be produced which are higher in grade and will store for longer periods of time than those currently being produced. Pilot plant studies made by TVA have indicated that the maximum grade permissible with his teaching is about 14–44–0 and it contains only about 50 percent of the $P_2O_5$ in polyphosphate form; even then clay is required to make the salt suspension usable under normal conditions. The teachings of Jones could greatly improve production of salt suspensions over those currently being produced; but even so, the 14–44–0 is not as concentrated as 14–47–0 clayless suspension and would not be nearly as desirable for production of clear liquids since the plant nutrient solubility (39% total plant nutrient at 32° F.) is greatly reduced by the relatively high $N:P_2O_5$ weight ratio (0.32) and low polyphosphate level (45% of total $P_2O_5$ in polyphosphate form). Another disadvantage of 14–44–0 and other salt suspensions for the production of clear liquids is that they contain clay. The maximum solubility of liquids prepared from 14–47–0 is about 48 percent total plant nutrient and it does not contain clay.

I have discovered quite unexpectedly that I am able to obtain the suspensions just described above by very carefully controlling, within a range of about 1 percent, the $P_2O_5$ content of the superphosphoric acid feed constituent to my process. I have found, as will be demonstrated infra, that I can consistently produce clayless fertilizer suspensions as high as grade 14–47–0 if I hold the $P_2O_5$ content of the superphosphoric acid fed to my process in the range from about 80 to 81 percent $P_2O_5$ and that when the feed acid is not controlled within this critical range, i.e., above 81 percent or below 80 percent, my new, improved clayless suspensions cannot be produced, at least to the extent of having the desirable storage properties which are necessary if such suspensions are to be handled and stored for even brief periods of only several weeks under unclimatic conditions such as in storage tanks during the hot summer months.

In my earliest work in developing my new process, I also found that quick cooling of the suspension product was not only desirable but necessary to effect a highly supersaturated solution wherein is formed a multitude of minute crystals of fertilizer salts. In the bench-scale apparatus that I utilized in this earlier work, I was able to attain the degree of quenching or quick-cooling necessary to prepare the ammonium polyphosphate suspension fertilizers described supra by conventional means, i.e., the use of cool metal surfaces in contact with the fluid to be cooled. The particular cooling equipment utilized was a cooling coil through which chilled water was pumped in combination with stirring means in the suspension vessel to ensure agitation of the material to be cooled and flow thereof over the cooling coil. In my later work on my process and in scaling same up to pilot plant, I discovered that conventional cooling means and methods were not sufficient to yield the desired objectives of my invention in that individual crystals in the suspension were found to deposit on the cooled material surfaces of the cooling coils resulting in drastically reducing the heat transfer characteristics thereof, sometimes to the point that operation of the pilot plant had to be stopped. It was in this later work wherein I discovered what I consider to be the second portion of the instant invention and which constitutes the new subject matter of this my second filed application, to wit, the embodiment of cooling my suspension fertilizers prepared supra by direct contact with a chilled fluid immiscible with said suspensions.

A very important advantage of my invention is that all of the components of my suspension are completely water soluble and dissolve quite readily; therefore, clear solutions of the ammonium polyphosphate base solutions (11–37–0) can be made (by subsequently dissolving the suspension in water) which can be stored for months or even years. The clear liquids have advantages in that they do not contain water-insoluble materials, such as clay or other suspending agents commonly used in 12–40–0 base suspensions, which might be objectionable because of discoloration, settling out, and possibly cause crystal formation by seeding the solutions, especially if the solutions are in a supercooled state. Also when clay is present, such as in most common suspensions, the formation of water-insoluble magnesium salts has been known to result in considerable trouble to the fluid fertilizer industry. Therefore, the formation of magnesium salts is not possible in clear liquids produced from clayless 14–47–0 base suspension because of the absence of clay which normally contains magnesium.

It is therefore an object of the present invention to provide an improved process for the manufacture of upgraded high-analysis fluid clayless fertilizer suspensions of the ammonium polyphosphate base suspension type and ultimately three-component (N-P-K) suspensions made therefrom which contain higher proportions of the major plant nutrients—nitrogen, phosphorus, and/or potassium—than fertilizer suspensions of either the clay or clayless type produced by the methods of the prior art.

Another object of the present invention is to provide an improved process for the manufacture of upgraded high-analysis fluid clayless fertilizer suspensions of the ammonium polyphosphate base suspension type and ultimately three-component (N-P-K) suspensions made therefrom which contain higher proportions of the major plant nutrients, nitrogen, phosphorus and/or potassium, than fertilizer suspensions of either the clay or clayless type produced by the methods of the prior art, and which suspensions are characterized by the elimination therein of growth of crystals larger than about 20 mesh.

Also a major object of the present invention is to provide an improved process for the manufacture of upgraded high-analysis fluid fertilizer of the ammonium polyphosphate base suspension type which contains higher proportions of plant nutrients, nitrogen and phosphorus, than fertilizer suspensions of either clay or clayless type produced by methods of the prior art, which suspensions are characterized by the elimination of water-insoluble materials and further characterized by the elimination of water-insoluble materials in the production of three-component (N-P-K) fluid fertilizers of either suspension or liquid type.

Still another object of the present invention is to provide an improved process for the manufacture of upgraded high-analysis fluid clayless fertilizer suspensions of the ammonium polyphosphate base suspension type and ultimately three-component (N-P-K.) suspensions made therefrom which contain higher proportions of the major plant nutrients, nitrogen, phosphorus, and/or potassium, than fertilizer suspensions of either the clay or clayless type produced by the methods of the prior art, which suspensions are characterized by the elimination therein of growth of crystals larger than about 20 mesh, and which suspensions are further characterized by the fact that the viscosities thereof are substantially stable with time of storage, and the heretofore dependent and proportional relationship of viscosities of suspension fertilizers and storage times substantially eliminated therefrom.

A further object of the present invention is to provide an improved process for the manufacture of upgraded high-analysis fluid clayless fertilizer suspensions of the ammonium polyphosphate base suspension type and ultimately three-component (N-P-K) suspensions made therefrom which contain higher proportions of the major plant nutrients, nitrogen, phosphorus and/or potassium, than fertilizer suspensions of either the clay or clayless types produced by the methods of the prior art, which suspensions are characterized by the elimination therein of growth of crystals larger than about 20 mesh, which suspensions are further characterized by the fact that the viscosities thereof are substantially stable with time of storage and the heretofore dependent and proportional relationship of viscosities of suspension fertilizers and storage times substantially eliminate therefrom; and which fertilizer suspensions are still further characterized by the fact that eliminated therefrom is any significant settling of solids therein such that the suspension volumes thereof is as great as about 95 percent.

Included as an object of the present invention is to provide an intermediate raw material for the manufacture of high-analysis clear liquid fertilizer of the ammonium polyphosphate base solution type and ultimately three-component (N-P-K) solutions made therefrom and which fertilizer solutions are characterized by the fact that the liquids are true solutions and contain no water-insoluble materials which might promote precipitation of other salts, and might be objectionable because of settling out or plugging lines and spray nozzles.

Still further and more general objects and advantages of the present invention will appear from the more detailed description set forth, it being understood, however, that this more detailed description is given by way of illustration and explanation only and not by way of limitation, since various changes therein may be made by those skilled in the art without departing from the spirit and scope of the present invention.

My invention, together with further objects and advantages thereof, will be better understood from the following description, examples, and the accompanying drawings wherein.

Figure 1:
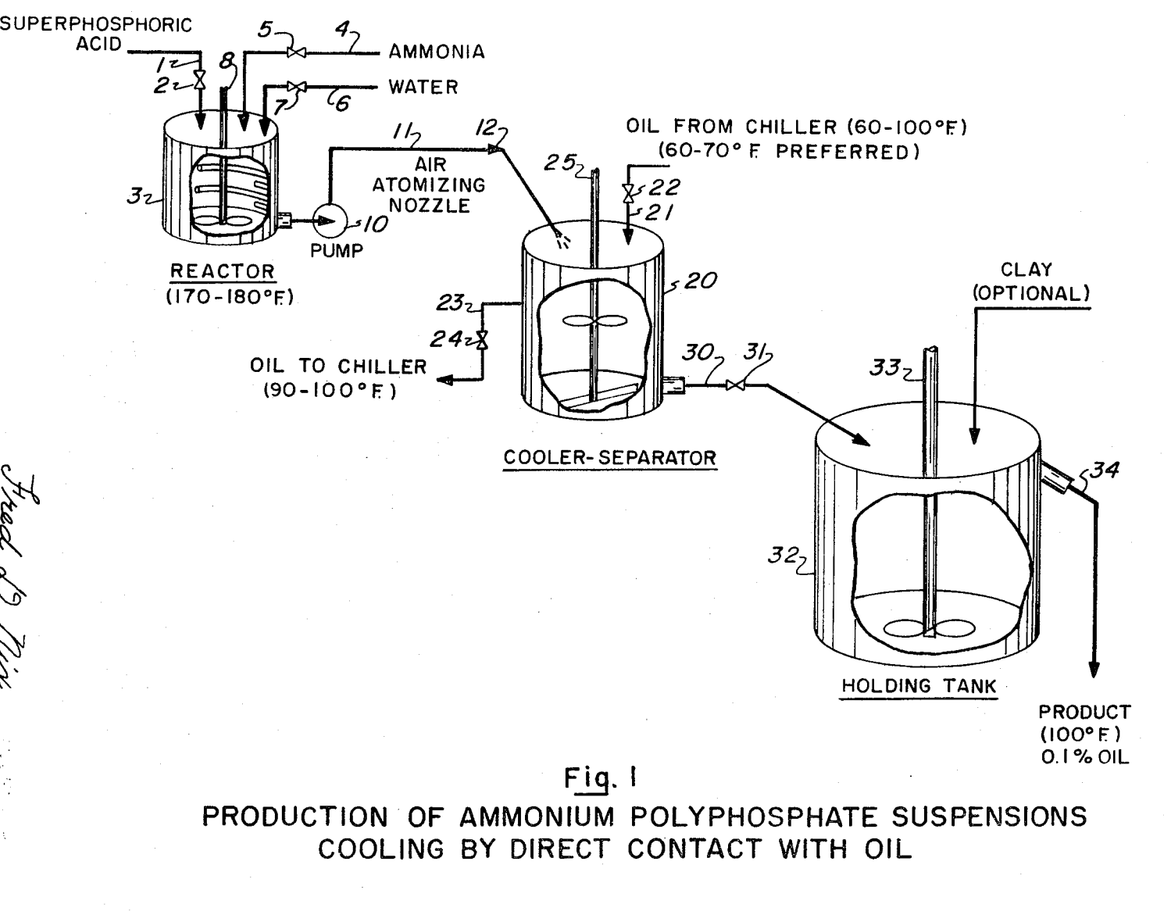
FIG. 1 depicts diagrammatically the equipment and arrangement I have utilized in finally developing my unusually high analysis ammonium polyphosphate fertilizer suspensions wherein the suspension is cooled by direct contact with a fluid immiscible therewith.

Referring now more specifically to FIG. 1, superphosphoric acid from a source not shown is fed via line 1 and means for control of flow 2 into reactor vessel 3. Simultaneously therewith ammonia, from a source not shown, is fed via line 4 and means for control of flow 5 into reactor vessel 3. Simultaneously therewith water, from a source not shown, is fed via line 6 and means for control of flow 7 into reactor 3 wherein the temperature is preferably maintained in the range from about 170 to about 180° F. Maintenance of this preferred temperature range can be accomplished with water-cooled coils illustrated but not specifically referred to by number. The $N:P_2O_5$ ratio and concentration of the fertilizer material in reactor 3 are controlled by continuous regulation of both the pH and specific gravity therein. At the elevated temperature in reactor 3, the fertilizer is a clear solution and there are little or no problems with fouling of the cooling coils, said cooling coils illustrated but not referred to by number. The resulting solution is pumped via pump 10 and line 11 to and through atomizing nozzle generally illustrated at 12 into cooler-separator 20 where it is cooled by dropping through a layer of immiscible fluid therein. As is illustrated, cooled oil from the chiller, not shown, is fed via line 21 and means for control of flow 22 into cooler-separator 20, and is exited therefrom via line 23 and means for control of flow 24 back to the oil chiller, not shown. For the purpose of general illustration, cooler-separator 20 in this figure is shown in conjunction with stirring means generally illustrated at 25. To promote the most rapid heat exchange in the cooler-separator vessel, it is most desirable to have the material to be cooled in the form of small droplets prior to contacting the cooling fluid. Also, it is important that vigorous agitation not be used in cooler-separator 20 since this will result in carry-over of oil in the product suspension. Satisfactory results were obtained with agitator blade peripheral speeds of agitator 25 in the neighborhood of about 1 to 1.5 feet per second in the fertilizer suspension collection area (bottom) and about a half-foot per second in the oil cooling section (top). As may be seen, the two peripheral speeds of the blades can be accomplished with both blades on a single shaft by simply proper proportioning the lengths thereof. Also, as indicated, the warm immiscible fluid or oil overflows from cooler-separator 20 and passes via line 23 and means for control of flow 24 to the chiller where it is cooled for reuse, for example, by pumping through coils immersed in cool water. The fertilizer suspension may be discharged from near the bottom of cooler-separator 20 by means of line 30 and means for control of flow 31 into holding tank 32. I have found that it is desirable to limit the retention time of the fertilizer suspension in cooler-separator 20. A 15-minute retention time was observed to minimize crystallization. Some crystallization can be tolerated, but complete crystallization in cooler-separator 20 would tend to increase the oil content of the fertilizer suspension, thereby increasing the cost of the process by the loss of oil. I have found that the oil seems to have a greater affinity for these crystals than for the fertilizer solution. As shown, the fertilizer suspension is fed via line 30 and means for control 31 to holding tank 32, where mild agitation is supplied by means 33 to promote additional crystallization. If the fertilizer suspension formulation is such that a suspending type clay is desired, it can, as shown in FIG. 1, be optionally added to holding tank 32 after cooling of the suspension to slightly above ambient temperature. The product fertilizer suspension is withdrawn from holding tank 32 as product by means of line 34.

Figure 2:
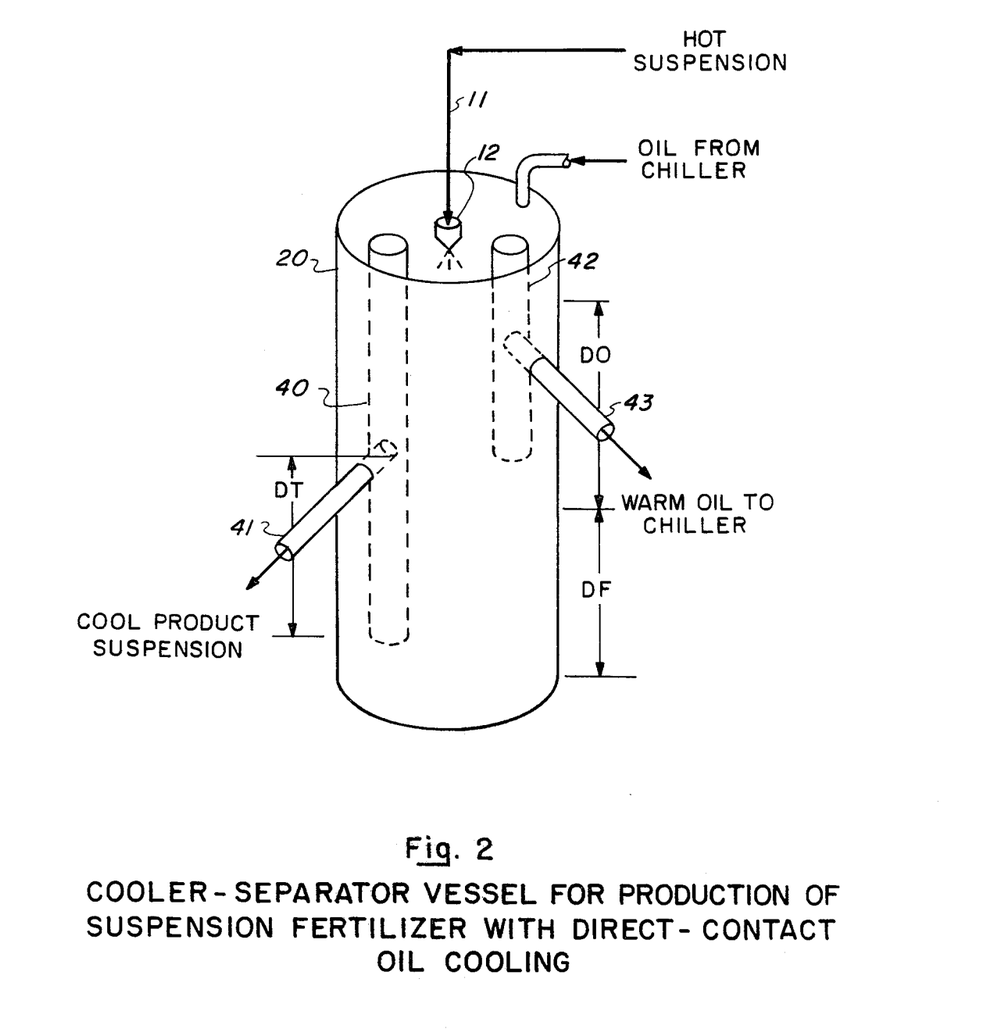
FIG. 2 shows in detail the important features of the cooler separator vessel which I prefer to use in carrying out the process shown in FIG. 1, supra.

Referring now more specifically to FIG. 2, I have found that cooler-separator 20 can be designed in such a manner so that little attention is required for its continuous and satisfactory operation. FIG. 2 depicts the preferred design of cooler-separator 20, which I have utilized in the scale-up of my invention to pilot-plant size. (Note: for convenience the stirrer mechanism is not shown.) In this preferred version of cooler-separator 20, a constant level of fertilizer suspension is maintained in vessel 20 by means of a product discharge tube 40 shown arranged in vertical alignment and having a generally horizontal portion thereof 41. This arrangement allows for travel of the fertilizer suspension which tends to settle at and near the bottom of cooler-separator 20 up through the oil layer thereover without physical contact therewith.

Figure 3:
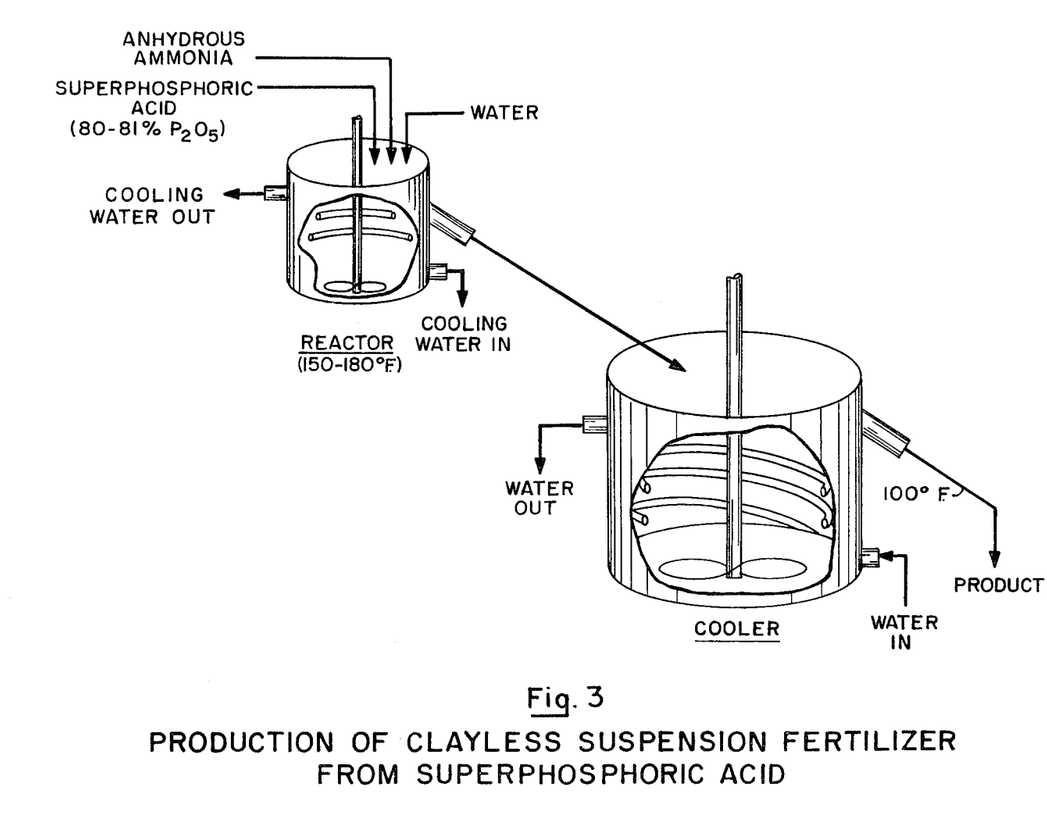
FIG. 3 depicts diagrammatically the equipment I first used in developing my process on a small scale and wherein conventional means and methods of cooling of my fertilizer suspension was employed.
Figure 4:
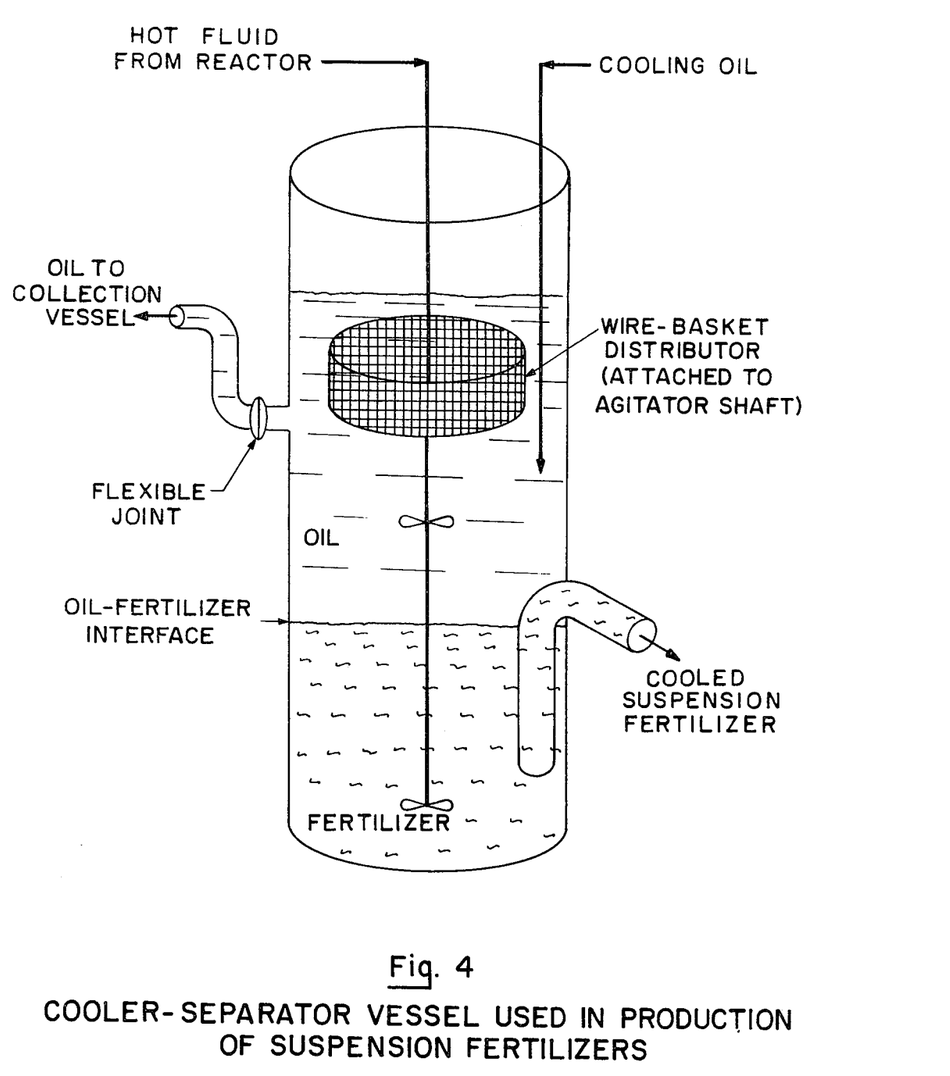
FIG. 4 shows another embodiment of a cooler-separator which I used on my small-scale or bench-scale work for separating the cooled suspension product from the cooling fluid immiscible therewith. As noted above, the cooler-separator equipment shown in detail in FIG. 2 is the preferred embodiment; however, the equipment shown in FIG. 4 did perform reasonably well on my bench-scale work, particularly wherein I was producing fertilizer suspensions of grades of slightly less than the preferred grade—14–47–0.

A second generally vertical discharge tube 42 with a generally horizontal section thereof 43 allows for escape of warm oil from cooler-separator 20 to the chiller not shown. In addition, discharge tube arrangement 42–43 maintains a constant total volume in cooler-separator vessel 20. The fertilizer level in cooler-separator 20 is determined by the depth of the oil layer plus the vertical height of the fertilizer discharge tube 40–41. In this embodiment of cooler-separator 20, the relationship between the vertical heights of the two tube arrangements 40–41 and 42–43 is based on the following equation:

$$D_1 \times DT = (DF \times D_1) + (DO \times D_2)$$

where, $D_1$ = density of fertilizer suspension
$DT$ = height of discharge tube
$DF$ = depth of fertilizer suspension layer from discharge tube inlet
$DO$ = depth of oil layer
$D_2$ = density of oil Referring now more specifically to FIG. 3, therein is depicted diagrammatically the equipment first used in developing my process, i.e., using conventional cooling means and methods to cool the suspensions. For the sake of clarity and to avoid possible confusion with the equipment shown in FIG. 1 supra, the various hardware depicted in this FIG. 3 has not in the discussion to follow been labeled numerically; however, it should be understood that the reactor shown in FIG. 3 is essentially identical to reactor 3 in FIG. 1, and further, that the cooler shown in this FIG. 3 is one of conventional means, whereas the cooler-separator 20 shown in FIGS. 1 and 2 is of a new design and operation. It also should perhaps be noted that the cooler shown in this FIG. 3 also acts as a holding tank. Superphosphoric acid, ammonia, and water are fed simultaneously to the reaction vessel which is maintained preferably at about 180° F. with cooling water flowing through the helical coils partially shown. The feed rates of materials to the reactor are controlled by continuous measurement of pH and specific gravity. The products therefrom overflow by gravity into the cooler where the temperature is decreased to about 100° F. The cooling step is of particular importance to the process because of the necessity of quickly showering out the fine self-suspending crystals and also to maintain a high polyphosphate $P_2O_5$ level. In my initial tests, an ammoniated superphosphoric acid (11–37–0) was placed in my reaction vessel to serve as a starter solution. A nominal 14–47–0 product from previous batchwise preparations was placed in the cooler to provide seed crystals for the formation of the suspension. Thereafter ammonia, superphosphoric acid (both within my critical range and without my critical range for the purposes of comparison) and formulation water was fed simultaneously to the reactor. The feed rates were maintained at levels designed to result in retention times of 30 to 60 minutes in the reactor and cooler, respectively. Vigorous agitation was applied in both reactor and cooler. The pH level in the reactor was kept in the range from about 6.2 to about 6.3 by adjusting the ammonia introduction rate. To control the grade of the product, specific gravity was determined by continuous measurements of the clear liquid fertilizer in the reaction vessel and usually kept within the range of 1.470 to 1.483 by appropriate changes in the feed rate of water thereto. This general procedure was followed in subsequent tests with the exceptions as to individual tests, which are discussed infra.

In order that those skilled in the art may better understand how the present invention can be practiced to manufacture ammoniated super-phosphoric acid base suspensions which are higher in grade and which will store for longer periods of time than those produced by the teachings of the prior art and which suspensions are characterized by the elimination thereof of growth of large crystals, increases in viscosity, or significant settling of solids, the following examples are given by way of illustration and not by way of limitation. Please note: The first nine examples (I–IX) relate to my earliest work wherein conventional cooling means was utilized. Example X et seq. relate to my subsequent work and developments wherein I utilized cooling of the suspension by direct contact therewith a chilled immiscible fluid.

Example I

In this series of tests, the procedure indicated above of initially using an ammoniated superphosphoric acid (11-37-0) which was placed in the reaction vessel to serve as a starter solution was followed. In addition, a nominal 14-47-0 product from previous preparations was placed in the cooler to provide seed crystals for formation of the suspension. Although these tests were made by earlier procedures, I had already ascertained that about 80 percent $P_2O_5$ superphosphoric acid was optimum and that 78 percent $P_2O_5$ superphosphoric acid would not produce the desired results. Accordingly, in these tests, the optimum acid was introduced into the process containing about 79.5 and 80 percent $P_2O_5$, whereas the product, for comparison, was made from a 78 percent $P_2O_5$ phosphoric acid; these variations as well as others are shown in the footnote of Table I below, which summarizes the results of these tests, which were performed essentially as described in my description accompanying the figure.

71.6 percent of the $P_2O_5$ was in polyphosphate form. The viscosity of the freshly prepared suspension was 800 centipoises at 80° F. After 30 days' storage at 80° and 32° F., the volume (percent of total) of clear supernatant liquid was 4 and 0 percent, respectively. The suspension contained 8.5 percent by weight of plus 20-mesh crystals after 30 days' of storage at 80° F. There was no plus 20-mesh material present at 32° F. After 60 days' of storage at 80° and 32° F., the respective 20-mesh fractions were 7.9 and 0 percent.

TESTS WITH ACIDS OF OPTIMUM CONCENTRATION

Example IV

An acid containing 80.1 percent $P_2O_5$ was fed simultaneously with ammonia and water to the reactor. The suspension contained 14.0 percent N and 46.9 percent $P_2O_5$; 76.8 percent of the $P_2O_5$ was in polyphosphate form. The viscosity of the freshly prepared product was 470, TABLE I.—SUSPENSION FERTILIZERS BASED UPON SHOWERING OUT OF FINE POLYPHOSPHATE CRYSTALS

| Test No. | Operating pH | Chemical analysis, percent | | Polyphosphate $P_2O_5$, percent of total | Product pH | Viscosity a of freshly prepared suspensions at indicated temperature,° F. | | | Volume of clear liquid, percent of total volume, after storage for 30 days at indicated temperature,° F. | | | Percent by weight of +20 mesh crystals after storage for 30 days at indicated temperature,° F. | | |
|---|---|---|---|---|---|---|---|---|---|---|---|---|---|---|
| | | N | $P_2O_5$ | | | 100 | 80 | 32 | 100 | 80 | 32 | 100 | 80 | 32 |
| 1 b | 6.3 | 14.0 | 46.4 | 71.1 | 6.3 | 400 | 610 | 5,200 | 8 | 0 | 0 | c 7.7 | c 0 | c 0 |
| 2 b,d | 6.3 | 14.0 | 46.3 | 71.1 | 6.3 | 520 | 720 | 6,900 | 15 | 0 | 0 | c 14.6 | c 0 | c 0 |
| 3 e | 6.2 | 14.0 | 46.4 | 68.3 | 6.2 | 730 | f 4,000 | (g) | 44 | 5 | 0 | h 6.2 | h 16 | h 21.3 |
| 4 b | 6.2 | 14.1 | 46.3 | 72.8 | 6.2 | 410 | 710 | 5,100 | 6 | 4 | 0 | 0.9 | 1.4 | 0 |
| 5 b | 6.1 | 14.1 | 47.0 | 71.1 | 6.1 | 490 | 800 | 7,100 | 6 | 4 | 0 | 1.4 | 3.4 | 0 | a Measured with Brookfield viscometer with spindle Nos. 4 or 5 rotated at 50 to 100 r.p.m.
b Made with 79.5 to 80% $P_2O_5$ acid.
c After 60 days.
d Added clay (0.5% Min-U-Gel 200).
e Made with 78% $P_2O_5$ acid.
f Viscosity after 1 week was 670 centipoises.
g Nonpourable.
h After 45 days.

Remarks.—The following examples are broken down in three categories and reflect tests made with acids (a) below optimum concentration, (b) optimum concentration and acids (c) above optimum concentration. These tests again were made by using equipment similar to that shown in the figure and similar procedure accompanying the description thereof. In addition, these tests were performed after I had finally determined that the criticalness of my invention for preparing clayless high-analysis fertilizer base suspensions resided in feeding superphosphoric acid thereto containing between 80 and 81 percent $P_2O_5$.

TESTS WITH ACID BELOW OPTIMUM CONCENTRATION

Example II

An acid containing 78 percent $P_2O_5$ was fed simultaneously with ammonia and water to prepare the clayless suspension. The product contained 14.0 percent N and 46.4 percent $P_2O_5$; 68 percent of the $P_2O_5$ was in polyphosphate (nonortho) form. The viscosity of the freshly prepared suspension was very high (4000 centipoises at 80° F.) and it was nonpourable at 32° F. After storage for 30 days at 80° and 32° F., the suspension contained 5 and 0 percent, respectively, of the total volume present as clear supernatant liquid. After 45 days of storage at these temperatures the suspension contained 16.0 and 21.3 percent, respectively, of the total weight as plus 20-mesh crystals.

Example III

An acid containing 79.5 percent $P_2O_5$ was fed simultaneously with ammonia and water to the reactor. The product contained 14.1 percent N and 47.0 percent $P_2O_5$;

800, and 6000 centipoises at 100°, 80°, and 32° F., respectively. No crystal growth (+20 mesh) nor settling (clear liquid) was detected in storage tests upon the suspension for 60 days at 80° and 32° F.

Example V

An acid containing 80.4 percent $P_2O_5$ was fed simultaneously with ammonia and water to the reactor. The suspension contained 14.1 percent N and 47 percent $P_2O_5$. About 75 percent of $P_2O_5$ was in a polyphosphate form. The viscosity of the freshly prepared product was 530, 820, and 6000 centipoises at 100°, 80°, and 32° F., respectively. No crystal growth (+20 mesh) nor settling (clear liquid) was detected in storage tests upon the suspension for 60 days at 80° and 32° F.

Example VI

An acid containing 80.9 percent $P_2O_5$ was fed simultaneously with ammonia and water to the reactor. The suspension contained 14.1 percent N and 47.2 percent $P_2O_5$. Eighty percent of the $P_2O_5$ was in a polyphosphate form. The viscosity of the freshly prepared product was 560, 900, and 6700 centipoises at 100°, 80°, and 32° F., respectively. No crystal growth (+20 mesh) nor settling (clear liquid) was detected in storage tests upon the suspension for 60 days at 80° and 32° F.

TESTS WITH ACIDS ABOVE OPTIMUM CONCENTRATION

Example VII

An acid containing 81.3 percent $P_2O_5$ was used. A batch simultaneous ammoniation procedure was employed. The formulation water required for about a 2-kilogram batch of suspension was placed in the reaction vessel to serve as a starter. Then acid and ammonia were fed concurrently. Agitation was supplied by a laboratory stirrer. The pH was maintained at about 6 and the temperture was kept between 150° and 180° F. At the end of the ammoniation the solution was cooled to about 100° F. within 5 minutes. Agitation was continued until precipitation appeared complete. The suspension contained 13.8 percent N and 47.4 percent $P_2O_5$; 84.7 percent of the $P_2O_5$ was in polyphosphate form. The viscosity of freshly prepared suspension was 1100 centiposes at 80° F. and 20,000 centipoises at 32° F. which was considered to be excessive. Adjustment of the grade to exactly the desired 14–47–0 would probably further increase the viscosity.

Example VIII

The test was made with the same procedure that was described in Example VII. The acid used contained 83 percent $P_2O_5$. The suspension contained only 13 percent N and 45 percent $P_2O_5$; 87 percent of the $P_2O_5$ was in polyphosphate form. Even with this low grade, viscosity of the freshly prepared suspension was 1940 centipoises at 80° F. which is considered to be excessive. The suspension was nonpourable at 32° F.

Example IX

In small-scale tests of the production of clear 11–37–0 from 14–47–0 grade clayless suspensions, the dissolution rates were measured at several temperatures. When the temperatures of both the 14–47–0 and water were 40° F. or higher and with vigorous agitation, less than 2 minutes was required for dissolution.

A dissolution test at 80° F. was made with agitation provided by a ⅛-inch-diameter air sparger placed in a 4-inch-diameter vessel. The 14–47–0 grade clayless suspension was poured into the water at the point of most vigorous agitation. The time required for dissolution with this mild agitation was about 10 minutes. The materials required for the formulation were 1000 grams of 14–47–0 and 270 grams of water.

OIL COOLING (EXAMPLES X–XIX)

The general procedure used for the production of 14–47–0 clayless suspension with oil cooling involved feeding superphosphoric acid, ammonia, and water into a reaction vessel and then cooling the hot fertilizer solution by dropping it through a layer of oil. A combination cooler-separator vessel was used to separate the oil and fertilizer.

Data for the production of 14–47–0 ammonium polyphosphate clayless suspension by oil cooling are shown in Table II, infra. A flowsheet of the process as developed in the work is shown in FIG. 1. Variations in equipment and procedure during development is described in the individual examples given below. Also, unless otherwise noted, 80 percent $P_2O_5$ superphosphoric acid and mineral seal oil were used in the tests, and production rates were kept between 70 and 85 pounds per hour.

Example X

The vessels used consisted only of the reactor and cooler-separator (7 gal. capacity); the holding tank (FIG. 1) was not used. The hot solution flowed by gravity into the cooler-separator equipped with an agitator and was distributed into the oil by means of a wire basket (12 mesh) attached to the agitator shaft. Sufficient cooled oil was fed continuously to the cooler-separators to maintain the product temperature at about 100° F. The basket served to break up the stream of hot solution. Very mild agitation was supplied in the cooler-separator. The product retention time in the cooler-separator was 0.5 hour. The product grade was 13.5–46.7–0 and it contained no detectable oil. The viscosity of the product was 2800 cp. at 80° F. which was considered excessive. Also there was a differential of about 10° F. between the product oil temperature which indicated insufficient contact between the oil and fertilizer for good cooling efficiency.

Example XI

The equipment and procedure were the same as in Example X except the production rate was 40 pounds per hour and a slightly higher degree of agitation was supplied to the cooler-separator. The lower production rate resulted in twice the retention time of product in the cooler-separator. The product grade was 13.1–44.0–0 and it contained 1.5 percent oil. The viscosity of the product was 10,400 cp. at 80° F. which was considered excessive and attributed at least in part to the relatively high oil content. There also was no significant improvement in cooling efficiency (about 10° F. differential in temperature of oil and product).

Example XII

In view of results obtained in Examples X and XI, it is believed that additional retention time with mild agitation was needed during crystallization to produce less viscous products. Therefore, the holding tank equipped with an agitator was incorporated in the system as shown in FIG. 1. The cooler-separator vessel was about 2-liter capacity which resulted in a product retention time of about 0.03 hour. The product was fed by gravity into the cooler-separator. A wire basket was used as a means of distributing the product in the oil. The product grade was 14.1–46.7–0 and it contained <0.5 percent oil. The viscosity of the freshly prepared product was 2720 cp. at 80° F.; however, after 3 weeks' storage at 80° F. the viscosity was only 700 cp. The cooling efficiency, as indicated by temperature differential of oil and product, was not satisfactory.

Example XIII

In this test the volume of cooler-separator was increased sufficiently to give a product retention time of 0.15 hour. A prilling cup was used as a method for distributing the fertilizer in the oil. The product grade was 13.5–40.0–0 and it contained 3.0 percent oil. The viscosity of freshly prepared product was 28,000 cp. at 80° F. The cooling efficiency was not satisfactory.

Example XIV

The test was made with the same equipment as described in Example XII except in this test and all of the following examples given, an air atomizer was used to break up the hot fertilizer solution fed to the cooler-separator. With this type distribution the cooling efficiency was good with only a differential of 2° F. between the product and oil temperatures. The product retention time in the cooler-separator was 0.03 hour. The product grade was 13.2–45.1–0 and it contained 0.1 percent oil. The viscosity of the freshly prepared product was 1480 cp. at 80° F. which is considered near satisfactory (1000 cp.).

Example XV

The test procedure and equipment used were the same as in Example XIV except the product retention time in the cooler-separator was 0.15 hour (obtained by increasing the volume of the vessel). The cooling efficiency obtained was considered satisfactory. The product grade was 13.6–46.4–0 and it contained <0.1 percent oil. The viscosity was 740 cp. at 80° F.

Example XVI

The equipment and procedure were the same as in Example XV and similar good results were obtained. Good cooling efficiency was obtained with only 1° F. temperature differential between the oil and product. The product grade was 13.7–47.2–0 and it contained 0.1 percent oil. The viscosity of the freshly prepared product was 1120 cp. at 80° F.

Example XVII

The equipment and procedure were the same as in Example XVI except the volume of the cooler-separator was increased sufficiently to give a product retention time of 0.25 hour. Good cooling efficiency was obtained as indicated by the product and oil temperature differential (3° F.). The product grade was 13.6–47.0–0 and it contained 0.1 percent oil. The viscosity of the freshly prepared product was 790 cp. at 80° F.

Example XVIII

A test was made in which kerosene was used as the cooling medium. The results obtained appeared to be equally as good as with mineral seal oil. The product grade was 13.6–46.6–0 and it contained 0.2 percent oil. The viscosity of freshly prepared product was 1010 cp. at 80° F.

Example XIX

There have been problems with fouling of water-cooled heat exchangers in commercial production of 13–41–0 (2 percent clay) grade fertilizer. A test was made to determine if oil cooling could be used to solve the problems. In making the test, 13–41–0 was prepared by ammoniation of 77 percent $P_2O_5$ superphosphoric acid. Clay was added in the holding tank. The viscosity of the freshly prepared product was 400 cp. at 80° F.

These tests (Examples X–XIX) indicate that product grades 13–41–0 or 14–47–0 can be produced successfully with oil cooling. Also, since 13–43–0 is of intermediate concentration between these fertilizer products, no problems would be expected in its production.

Example XX

While most any droplet-forming means would be suitable for use in my process, I have, for convenience, limited my work to the use of rotating cylindrical cups and an air atomizer. Also, although I have used many types of liquid medium such as oils of mineral origin, for convenience I have limited myself in the above examples pertaining to oil cooling principally to the use of mineral seal oil. I wish it to be understood, however, that I have, in still other tests, used as a liquid medium such materials as motor oils, metallurgical quenching oil, mineral spirits, kerosene, and various combinations thereof.

What I claim as new and desire to secure by Letters Patent of the United States is:

2. The process of claim 1 wherein said cooled liquid medium is an oil of mineral origin.

3. The process of claim 1 wherein said droplets of said supersaturated solution range in size from drops formed by a standard prilling cup to a fine mist formed by an air atomizer.

4. The process of claim 1 wherein said supersaturated solution is in contact with said liquid medium for a residence time in the range from about 10 to about 15 minutes.

1. An improved process for the production of stable, clayless suspension type fertilizers having desirable flow properties, higher than previously obtainable plant food content and vastly improved storage characteristics which comprises the steps of rapidly reacting ammoniating fluid and superphosphoric acid in a reactor vessel; controlling the water content of said ammoniating fluid and said superphosphoric acid in said reactor vessel to effect a highly supersaturated solution and quick-cooling to form a multitude of minute crystals of fertilizer salts in a standard aqueous solution thereof and withdrawing the resulting suspension as product, the improvement in combination therewith for ensuring that the improved suspension has higher plant food contents that heretofore previously obtainable and greatly improved storage characteristics, which offset the deleterious effect of hydrolysis of ammonium polyphosphates in said fertilizer suspensions to ammonium orthophosphate with the resulting decrease in pH of the suspension during subsequent storage, which improvement is characterized by the fact that the heretofore requisite amount of clay for use as a nucleating and/or stabilizing agent for such suspensions is completely eliminated therefrom, and which improvement comprises the additional steps of:

(1) maintaining the $P_2O_5$ content of said superphosphoric acid introduced into said reactor vessel in the range from 80 to 81 percent by weight;

(2) discharging from said reactor vessel said supersaturated solution into droplet-forming means;

(3) dividing the material in said droplet-forming means into drops and causing the droplets to cool, coalesce, and collect as a layer of product, said layer of prod- TABLE II.—CONTINUOUS PILOT PLANT STUDY OF COOLING METHODS IN PRODUCTION [a] OF SUSPENSION FERTILIZERS
[Direct-contact oil cooling]

| | | Cooler-separator | | | | | Product | | | | | |
|---|---|---|---|---|---|---|---|---|---|---|---|---|
| | | | | | Product | | Analysis, percent by wt. | | | | | Viscosity at 80° F. (freshly prepared) |
| | Holding tank used? | Type oil | Solution distributor | Oil discharge temp., °F. | Retention time, hr. | Discharge temp., °F. | N | $P_2O_5$ | | | Oil | |
| Example | | | | | | | | Total | Ortho | | | |
| X | No | Mineral seal | Wire basket | 102 | 0.5 | 111 | 13.5 | 46.7 | 10.4 | Nil | 2,800 |
| XI | No | do | do | 92 | [b]1.0 | 103 | 13.1 | 44.0 | 9.7 | 1.5 | 10,400 |
| XII | Yes | do | do | 91 | 0.03 | 130 | 14.1 | 46.7 | 10.3 | <0.5 | [c] 2,720 |
| XIII | Yes | do | Prilling cup | 86 | 0.15 | 115 | 13.5 | 46.6 | 9.5 | 3.0 | 28,000 |
| XIV | Yes | do | Air atomizer | 101 | 0.03 | 103 | 13.2 | 45.1 | 11.0 | 0.1 | 1,480 |
| XV | Yes | do | do | 96 | 0.15 | 102 | 13.6 | 46.4 | 4.3 | <0.1 | 740 |
| XVI | Yes | do | do | 96 | 0.15 | 97 | 13.7 | 47.2 | 10.9 | 0.1 | 1,120 |
| XVII | Yes | do | do | 95 | 0.25 | 98 | 13.6 | 47.0 | 13.4 | 0.1 | 790 |
| XVIII | Yes | Kerosene | do | 94 | 0.25 | 98 | 13.6 | 46.6 | 11.0 | 0.2 | 1,010 |
| XIX | Yes | Mineral seal | do | 94 | 0.15 | 98 | 13 | 41 | 16 | 0.5 | [d] 400 |

[a] Except when noted, production rate was 70 to 85 lb./hr.
[b] Production rate, 40 lb./hr.
[c] After 3 weeks' storage at 80° F., the viscosity was only 700 cp.
[d] Contained 2% clay.

While I have shown and described particular embodiments of my invention, modifications and variations thereof will occur to those skilled in the art. I wish it to be understood therefore that the appended claims are intended to cover such modifications and variations which are within the true scope and spirit of my invention.

uct formed beneath a layer of liquid medium by subsequently allowing said droplets to fall into and through said liquid medium, said liquid medium maintained at a temperature in the range from about 60° F. to about 100° F., and characterized by the fact that said suspension type fertilizer is substantially insoluble therein and substantially nonreactive therewith;

(4) simultaneously withdrawing at least a portion of said liquid medium to cooling means wherefrom the resulting cooled liquid medium is returned and combined with the main body of said liquid medium; and (5) simultaneously withdrawing at least a portion of said product suspension collected vertically beneath said liquid medium as product, said product characterized by the fact that it is contaminated with no greater than about 0.1 percent by weight of said liquid medium.

References Cited

UNITED STATES PATENTS

| | | | |
|---|---|---|---|
| 3,464,808 | 9/1969 | Kearns | 71—34 |
| 3,484,192 | 12/1969 | Fair et al. | 23—107 |
| 3,578,433 | 5/1971 | Bottia et al. | 71—1 |
| 3,539,326 | 11/1970 | Otsuka et al. | 71—28 X |

REUBEN FRIEDMAN, Primary Examiner

R. BARNES, Assistant Examiner

U.S. Cl. X.R.

23—107; 71—43, 64 C